(12) United States Patent
Creamer et al.

(10) Patent No.: US 9,688,947 B2
(45) Date of Patent: Jun. 27, 2017

(54) DISPERSANT COPOLYMERS HAVING HIGH COMPATIBILITY WITH SURFACTANTS

(71) Applicants: Rohm and Haas Company, Philadelphia, PA (US); Dow Global Technologies LLC, Midland, MI (US)

(72) Inventors: Marianne P. Creamer, Warrington, PA (US); Jan E. Shulman, Newtown, PA (US); Eric P. Wasserman, Hopewell, NJ (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 31 days.

(21) Appl. No.: 14/649,980

(22) PCT Filed: Dec. 4, 2013

(86) PCT No.: PCT/US2013/072977
§ 371 (c)(1),
(2) Date: Jun. 5, 2015

(87) PCT Pub. No.: WO2014/099362
PCT Pub. Date: Jun. 26, 2014

(65) Prior Publication Data
US 2015/0315528 A1  Nov. 5, 2015

Related U.S. Application Data

(60) Provisional application No. 61/739,034, filed on Dec. 19, 2012.

(51) Int. Cl.
| | | |
|---|---|---|
| *C11D 1/00* | (2006.01) |
| *C08F 20/06* | (2006.01) |
| *C08F 220/06* | (2006.01) |
| *C11D 3/37* | (2006.01) |
| *C08F 222/10* | (2006.01) |
| *C08F 2/06* | (2006.01) |
| *C08F 8/14* | (2006.01) |
| *C08F 220/20* | (2006.01) |
| *C08F 220/18* | (2006.01) |

(52) U.S. Cl.
CPC .............. *C11D 3/3757* (2013.01); *C08F 2/06* (2013.01); *C08F 8/14* (2013.01); *C08F 220/06* (2013.01); *C08F 222/10* (2013.01); *C08F 220/20* (2013.01); *C08F 2220/1833* (2013.01)
(Continued)

(58) Field of Classification Search
CPC ....... C11D 1/00; C11D 3/3746; C11D 3/3757; C08F 20/06; C08F 220/06
See application file for complete search history.

(56) References Cited

U.S. PATENT DOCUMENTS

| 4,415,703 A | 11/1983 | Toba et al. |
| 2003/0162679 A1 | 8/2003 | Rodrigues et al. |
| 2006/0094636 A1 | 5/2006 | Rodrigues |
| 2011/0152428 A1 | 6/2011 | Inaya et al. |
| 2012/0165242 A1 | 6/2012 | Ng et al. |

FOREIGN PATENT DOCUMENTS

| EP | 105613 | * 4/1984 | ............. B29H 21/04 |
| JP | 1999060616 | 8/1997 | |
| KR | 2010030896 | 3/2010 | |

* cited by examiner

*Primary Examiner* — Brian P Mruk
(74) *Attorney, Agent, or Firm* — Kenneth Crimaldi

(57) ABSTRACT

A polymeric dispersant comprising: (a) from 50 to 95 wt % polymerized residues of monomer (A):

(A)

wherein $R_1$ is hydrogen, methyl, ethyl or COOX; $R_2$ is hydrogen, methyl or ethyl;
$R_3$ is hydrogen, methyl or ethyl; and X is hydrogen, sodium, potassium, ammonium or a combination thereof;
(b) from 1 to 20 wt % polymerized residues of monomer (B):

(B)

wherein $R_4$, $R_5$, and $R_6$ are independently hydrogen, methyl or ethyl; $R_7$ is $C_8$-$C_{30}$ alkyl or $C_8$-$C_{30}$ aralkyl; and (c) from 3 to 30 wt % polymerized residues of monomer (C):

(C)

wherein $R_8$, $R_9$, and $R_{10}$ are independently hydrogen, methyl or ethyl; $R_{11}$ and $R_{12}$ are independently hydrogen, $C_1$-$C_8$ alkyl or hydroxymethyl; and
n is an integer from 1 to 3.

11 Claims, No Drawings

DISPERSANT COPOLYMERS HAVING HIGH COMPATIBILITY WITH SURFACTANTS

This application claims priority to Provisional Application Ser. No. 61/739,034, filed Dec. 19, 2012.

BACKGROUND

This invention generally relates to a dispersant copolymer useful to improve the performance of detergent compositions, especially those having high surfactant levels.

Polymers made from hydrophilic and hydrophobic acrylic monomers are known and used for various purposes. For example, U.S. Pub. No. 2011/0152428 discloses a polymer comprising polymerized residues of methacrylic acid, methoxypolyethylene glycol methacrylate and stearyl methacrylate as a dispersant for inorganic pigments. However, the prior art does not disclose a polymer according to the present invention which gives superior results as a laundry detergent additive.

The problem solved by the present invention is to provide a dispersant copolymer for use in improved detergent compositions.

STATEMENT OF THE INVENTION

The present invention is directed to a polymeric dispersant comprising: (a) from 50 to 95 wt % polymerized residues of monomer (A):

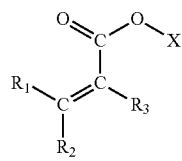

wherein $R_1$ is hydrogen, methyl, ethyl or COOX; $R_2$ is hydrogen, methyl or ethyl; $R_3$ is hydrogen, methyl or ethyl; and X is hydrogen, sodium, potassium, ammonium or a combination thereof;
(b) from 1 to 20 wt % polymerized residues of monomer (B):

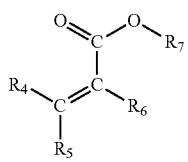

wherein $R_4$, $R_5$, and $R_6$ are independently hydrogen, methyl or ethyl; $R_7$ is $C_6$-$C_{30}$ alkyl or $C_8$-$C_{30}$ aralkyl; and (c) from 3 to 30 wt % polymerized residues of monomer (C):

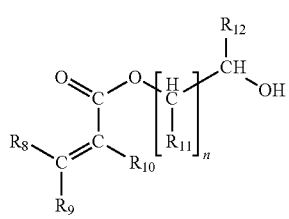

wherein $R_8$, $R_9$, and $R_{10}$ are independently hydrogen, methyl or ethyl; $R_{11}$ and $R_{12}$ are independently hydrogen, $C_1$-$C_8$ alkyl or hydroxymethyl; and n is an integer from 1 to 3.

The present invention is further directed to a method for making the polymeric dispersant comprising combining a monomer of structure A and monomer of structure B in a solvent mixture composed of a mixture of an organic polyol and water, wherein the organic polyol has formula (I):

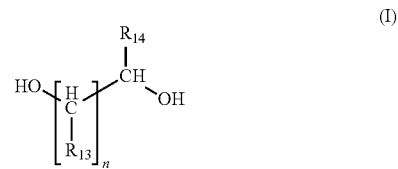

wherein $R_{13}$ and $R_{14}$ independently are hydrogen, $C_1$-$C_8$ alkyl or hydroxymethyl; and n is an integer from 1 to 3.

DETAILED DESCRIPTION OF THE INVENTION

All percentages are weight percentages (wt %) and all fractions are by weight, unless otherwise indicated and all temperatures are in ° C., unless otherwise indicated. Measurements made at "room temperature" (room temp.) were made at 20-25° C. Weight average molecular weights, $M_w$, and number average molecular weights, $M_n$, are measured by gel permeation chromatography (GPC) using polyacrylic acid standards, as is known in the art. The techniques of GPC are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. The molecular weights reported herein are in units of daltons. As used herein the term "(meth)acrylic" refers to acrylic or methacrylic. Alkyl groups are saturated hydrocarbyl groups which may be straight or branched. Aralkyl groups are alkyl groups substituted by aryl groups. Examples of aralkyl groups include, e.g., benzyl, 2-phenylethyl and 1-phenylethyl. The term "polymerized residue" of a monomer refers to a part of a polymer chain which is the result of polymerization of that monomer along with other monomers; this is also referred to as a monomer unit or repeat unit.

Preferably the polymeric dispersant has at least 55 wt % polymerized residues of monomer (A), preferably at least 60 wt %, preferably at least 65 wt %; preferably no more than 90 wt %, preferably no more than 85 wt %, preferably no more than 80 wt %. Preferably the polymeric dispersant has at least 2 wt % polymerized residues of monomer (B), preferably at least 3 wt %, preferably at least 5 wt %, preferably at least 6 wt %, preferably at least 7 wt %; preferably no more than 18 wt %, preferably no more than 15 wt %, preferably no more than 14 wt %, preferably no more than 12 wt %. Preferably the polymeric dispersant has at least 4 wt % polymerized residues of monomer (C), preferably at least 5 wt %, preferably at least 6 wt %, preferably at least 7 wt %, preferably at least 8 wt %; preferably no more than 25 wt %, preferably no more than 22 wt %, preferably no more than 20 wt %, preferably no more than 18 wt %, preferably no more than 16 wt %. Preferably, the polymer contains no more than 10 wt % of polymerized residues of monomers that are not acrylic monomers, preferably no more than 7 wt %, preferably no more than 5 wt %, preferably no more than 2 wt %.

Preferably, $R_1$ is hydrogen, methyl or COOX; preferably hydrogen or COOX; preferably hydrogen. Preferably, $R_2$ is hydrogen or methyl; preferably hydrogen. Preferably, $R_3$ is hydrogen or methyl; preferably hydrogen. Preferably, X is hydrogen, sodium, ammonium or a combination thereof; preferably sodium, ammonium or a combination thereof. Preferably, $R_4$, $R_5$, and $R_6$ independently are hydrogen or methyl; preferably $R_4$ and $R_5$ are hydrogen and $R_6$ is hydrogen or methyl. Preferably, $R_7$ is $C_{12}$-$C_{30}$ alkyl or $C_{12}$-$C_{30}$ aralkyl, preferably $C_8$-$C_{30}$ alkyl, preferably $C_{12}$-$C_{30}$ alkyl, preferably $C_{12}$-$C_{22}$ alkyl, preferably $C_{16}$-$C_{22}$ alkyl. Preferably, $R_8$ and $R_9$ independently are hydrogen or methyl, preferably hydrogen. Preferably, $R_{10}$ is hydrogen or methyl; Preferably, $R_{11}$ and $R_{12}$ independently are hydrogen, $C_1$-$C_4$ alkyl or hydroxymethyl; preferably hydrogen, methyl or hydroxymethyl; preferably hydrogen or methyl. Preferably, n is 1 or 2, preferably 1. Especially preferred monomers of structure (A) include acrylic acid, methacrylic acid, maleic acid and their salts with sodium, potassium and ammonium. Especially preferred monomers of structure (B) include stearyl methacrylate, stearyl acrylate, cetearyl methacrylate, lauryl methacrylate and behenyl acrylate. Especially preferred monomers of structure (C) include 2-hydroxyethyl acrylate, 2-hydroxypropyl acrylate, 2-hydroxy-1-methyl-ethyl acrylate, 2,3-hydroxypropyl acrylate, 3-hydroxypropyl acrylate and methacrylate analogues thereof.

In one preferred embodiment, the copolymer includes other monomers, e.g., (meth)acrylamides, vinyl acetate, N-vinylpyrrolidone and N-vinylimidazole.

Preferably, the polymer has a number average molecular weight ($M_n$) in the range from 1,000 to 10,000, preferably at least 1,200, preferably at least 1,400, preferably at least 1,600, preferably at least 1,800, preferably at least 2,000; preferably no more than 7,000, preferably no more than 4,000, preferably no more than 3,500, preferably no more than 3,000. Preferably, the polymer has a weight average molecular weight ($M_w$) in the range from 2,000 to 15,000, preferably at least 3,000, preferably at least 4,000, preferably at least 5,000, preferably at least 6,000, preferably at least 7,000; preferably no more than 12,000, preferably no more than 10,000, preferably no more than 9,000, preferably no more than 8,500.

Preferably, the amount of polymerized crosslinker residue in the polymer is no more than 0.1 wt %, preferably no more than 0.05 wt %, preferably no more than 0.03 wt %, preferably no more than 0.02 wt %, preferably no more than 0.01 wt %, preferably no more than 0.005 wt %.

Preferably, the polymeric dispersant is formulated in a detergent composition in an amount of at least 0.4 wt %, preferably at least 0.6 wt %, preferably at least 0.8 wt %, preferably at least 1 wt %, preferably at least 1.5 wt %, preferably at least 2 wt %, preferably at least 2.5 wt %; preferably no more than 10 wt %, preferably no more than 7.5 wt %, preferably no more than 5 wt %. Preferably, the detergent composition comprises at least 40 wt % water, preferably at least 45 wt %, preferably at least 50 wt %, preferably at least 55 wt %, preferably at least 60 wt %. Preferably, the detergent composition comprises no more than 80 wt % water, preferably no more than 75 wt %, preferably no more than 70 wt %, preferably no more than 65 wt %, preferably no more than 60 wt %. In one preferred embodiment, the detergent composition comprises at least 75 wt % surfactant and no more than 15 wt % water; preferably at least 80 wt % surfactant and no more than 10 wt % water. Preferably, the detergent composition is a liquid or gel at 20° C. Preferably, the detergent composition comprises from 0 to 10 wt % (see comments above) of alcoholic solvents, preferably at least 1 wt %, preferably at least 2 wt %, preferably at least 3 wt %, preferably at least 4 wt %; preferably no more than 8 wt %, preferably no more than 7 wt %, preferably no more than 6 wt %. Preferably, alcoholic solvents are $C_2$-$C_4$ aliphatic alcohols and glycols, preferably $C_2$-$C_3$ alcohols and glycols; preferably ethanol, propylene glycol, glycerin, dipropylene glycol, tripropylene glycol, polyethylene glycol and 2-butoxyethanol. In the preferred embodiment in which the detergent composition comprises no more than 15 wt % water, preferably the composition comprises from 10 to 30 wt % alcoholic solvent, preferably from 10 to 25 wt %, preferably from 15 to 25 wt %.

Preferably, the surfactant comprises at least one surfactant selected from anionic and nonionic surfactants. Preferably, nonionic surfactants have an alkyl group having at least eight carbon atoms and at least five polymerized ethylene oxide or propylene oxide residues. Preferably, anionic surfactants have an alkyl group having at least ten carbon atoms and an anionic group, preferably selected from sulfonates and carboxylates. Anionic surfactants also may have polymerized residues of ethylene oxide, and/or may have aromatic rings, e.g., linear alkylbenzene sulfonates. Examples of anionic surfactants include, e.g., fatty acid alkali metal salts, amine oxides and alkyl aryl sulfonates. Preferably, the detergent composition comprises at least 10 wt % surfactants, preferably at least 15 wt %, preferably at least 20 wt %, preferably at least 25 wt %, preferably at least 30 wt %, preferably at least 35 wt %. Preferably, the detergent composition comprises no more than 60 wt % surfactants, preferably no more than 55 wt %, preferably no more than 50 wt %, preferably no more than 45 wt %, preferably no more than 40 wt %, preferably no more than 35 wt %, preferably no more than 30 wt %. Preferably, the detergent composition comprises at least 6 wt % linear alkylbenzene sulfonates, preferably at least 8 wt %, preferably at least 10 wt %, preferably at least 12 wt %, preferably at least 14 wt %. Preferably, the detergent composition comprises no more than 40 wt % linear alkylbenzene sulfonates, preferably no more than 35 wt %, preferably no more than 30 wt %, preferably no more than 25 wt %.

Preferably, the pH of a liquid laundry detergent composition is adjusted to be in the range of 7.5 to 12, preferably from 7.5 to 11, preferably from 8 to 10, preferably from 8 to 9.5. Suitable bases to adjust the pH of the formulation include mineral bases such as sodium hydroxide and potassium hydroxide; and ammonium hydroxide. Mixtures of bases may be used. Suitable acids to adjust the pH of the aqueous medium include mineral acid such as hydrochloric acid, phosphoric acid, and sulfuric acid; and organic acids such as acetic acid. Mixtures of acids may be used.

In the method of this invention, an acidic acrylic monomer (A) and an unsaturated alkyl ester monomer (B) are allowed to polymerize in a solvent comprising an organic polyol (I) and water. This method produces a polymer containing polymerized residues of an ester formed the carboxylic acid group on monomer (A), or its polymerized residue, and the organic polyol. The organic polyol also serves as the solvent, along with any water which is present. In one preferred embodiment, the organic polyol serves also as the chain transfer agent and other chain transfer agents are substantially absent, i.e., they are present at levels below 0.5 wt %, preferably below 0.2 wt %, preferably below 0.1 wt %, preferably below 0.05 wt %. In one preferred embodiment, a chain transfer agent is added in an amount from 1 wt % to 30 wt %, preferably from 5 wt % to 20 wt %, exclusive of the organic polyol, and based on the weight of the reaction mixture. Preferably, the added chain transfer agent is an alkyl mercaptan, bisulfite salt or a redox catalyst; preferably dodecylmercaptan (DDM), sodium bisulfite, ferrous sulfate and isoascorbic acid. Especially preferred organic polyols include ethylene glycol, propylene glycol, glycerol and 1,3-propanediol. Unexpectedly, the organic polyol, which potentially could form esters with more than one carboxylic acid group resulting in crosslinking and gel formation, does not lead to formation of gels or other insoluble polymeric materials. Preferably, $R_{13}$ and $R_{14}$ independently are hydrogen, a $C_1$-$C_4$ alkyl group or a hydroxymethyl group; preferably hydrogen, methyl or hydroxymethyl; preferably hydrogen or methyl. Preferably, n is 1 or 2, preferably 1. Preferably, the weight ratio of monomers (A) and (B) to the organic polyol (I) and water is from 1:10 to 2:3, preferably from 1:5 to 1:2, preferably from 1:4 to 2:5.

Preferably, monomers are fed into the reaction mixture in a stirred reactor over a period of 0.5-10 hours (preferably 1-5 hours). Preferably, the final weight fraction of polymer is 10-60% (preferably 20-50%) in the solution of the organic polyol and water, with a water:polyol ratio of 0:100 to 1:4 (preferably 1:100-1:6, preferably 1:50 to 1:10). Preferably, over a time period roughly simultaneous with the monomer addition period, a solution (in water or other appropriate solvent) of a free-radical precursor taken from either the family of inorganic peroxy salts (such as sodium persulfate, ammonium persulfate), the family of organic peroxy esters and acids (such as 3-chloroperbenzoic acid, t-butyl peroxypivalate), organic peroxides (such as t-butyl hydroperoxide), or azo species containing a C—N=N—C group, is added to the reactor. Preferably, initiator levels in the reaction mixture vary from 1 to 10 wt %, preferably from 2 to 7 wt %. Preferably, the reaction is performed at a temperature of 25-150° C. (preferably 50-130° C., preferably 55-120° C.), with a polymerization time of 0.5-10 hours (preferably 1-6 hours, preferably 1.5-5 hours), at a pressure of 0.1-10 atmospheres (10 kPa to 1 MPa) (preferably 50 kPa to 200 kPa, preferably about atmospheric pressure, 100 kPa).

EXAMPLES

Method of NMR Determination of HPA Content

Approximately 300 mg of the dried dialyzed polymer was dissolved in 700 μL of DMSO-$d_6$, and the resulting solution was transferred to a 5 mm NMR tube. NMR spectra were obtained using a Bruker AVANCE300 spectrometer. The quantitative $^{13}$C spectra were acquired with the zgig30 pulse sequence using a recycle delay of 8 seconds.

For stearyl methacrylate the methyl and methylene resonances at 14 and 22 ppm were integrated. For hydroxypropyl acrylate (1° OH) the methine and methylene resonances at 71 and 64 ppm were integrated; for hydroxypropyl acrylate (2° OH) the methylene and methine resonances at 69 and 65 ppm were integrated. For acrylic acid the carbonyl resonances between 170-180 ppm were integrated, and the contribution from SMA and HPA were subtracted; for the lactone end-group formed by propylene glycol acting as a chain transfer agent, the quaternary resonance at 84 ppm in integrated.

Method of Dialysis

Dialysis was performed using a stirred 200 mL ultrafiltration cell from Amicon, equipped with a Millipore 500 g/mol cut-off membrane. Deionized water was added to the cell and with stiffing, ~10 g of polymer solution was added. When polymer was thoroughly mixed, the cell was closed, stiffing maintained and nitrogen gas applied directly to the cell to a maximum pressure of 70 psi. After the cell contents were concentrated to 50 mL, the pressure was released and the cell was refilled with deionized water and concentrated again. This was then repeated once more and the dialyzate finally concentrated to about 25 mL. The dialyzate was then freeze-dried to yield a solid material.

ABBREVIATIONS

AA: acrylic acid
HPA: hydroxypropyl acrylate (mixture of isomers)
PAA: polyacrylic acid
SMA: stearyl methacrylate
SXS: sodium xylenesulfonate
WI: whiteness index E313

Example 1

To a two liter round bottom flask, equipped with a mechanical stirrer, heating mantle, thermocouple, condenser, nitrogen inlet and inlets for the addition of cofeeds, was charged 450 g propylene glycol. The kettle contents were stirred and heated to 87±1° C. with a nitrogen sweep. In the meantime, a monomer solution of 186 g of glacial AA and 14 g of SMA was mixed thoroughly and added to a graduated cylinder for addition to the kettle. An initiator solution of 14 g of LUPERSOL 11 (tert-butyl peroxypivalate), was added to a syringe for addition to the kettle.

When the kettle contents reached reaction temperature of 87° C., the monomer and initiator cofeeds were started simultaneously and separately. The monomer cofeed was added over 120 minutes and the initiator cofeed was added over 125 minutes at 87±1° C. At the completion of the cofeeds, the reaction was held for 15 minutes at 87° C. A chaser of 1.75 g of Lupersol 11 was added to a syringe for addition to the kettle. After 15 minutes, the chaser was added over 10 minutes and then held for 30 minutes. After the hold, the reaction was then cooled and packaged.

The final product has a solid content of 35.97% (measured in a forced draft oven for 60 minutes at 150° C.). Final Brookfield viscosity=5140 cPs. Residual AA content was 2500 ppm. The weight- and number-average molecular weights were 1780 and 1290 g/mol, respectively, as measured by gel permeation chromatography.

Example 1a (MPF 13279)

The process of Example 1 was repeated at 75% larger scale. This material was dialyzed in water using a 500 Da cutoff membrane and the higher MW fraction was reduced to a semisolid by freeze-drying in vacuo. NMR analysis of the dialyzate gave 79 wt % acrylic acid, 9 wt % HPA, and 13 wt % SMA.

Example 2

To a two liter round bottom flask, equipped with a mechanical stirrer, heating mantle, thermocouple, condenser, nitrogen inlet and inlets for the addition of cofeeds, was charged 450 g propylene glycol. The kettle contents were stirred and heated to 96±1° C. with a nitrogen sweep. In the meantime, a monomer solution of 186 g of glacial AA and 14 g of SMA was mixed thoroughly and added to a graduated cylinder for addition to the kettle. The initiator solution of 14 g sodium persulfate dissolved in 25 g of deionized water was prepared, and added to a syringe for addition to the kettle.

When the kettle contents reached reaction temperature of 96° C., the monomer and initiator cofeeds were started simultaneously and separately. The monomer cofeed was added over 120 minutes and the initiator cofeed was added over 125 minutes at 96±1° C. At the completion of the cofeeds, the reaction was held for 15 minutes at 96° C. A chaser of solution of 1.0 g of sodium persulfate and 4 g of deionized water was added to a syringe for addition to the kettle. After 15 minutes, the chaser was added over 10 minutes and then held for 30 minutes. After the hold, the reaction was then cooled and packaged.

The final product has a solid content of 36.2%, a final viscosity of 4400 cPs. Residual AA content was 1946 ppm. The weight- and number-average molecular weights were 7478 and 1732 g/mol, respectively. A portion of the polymer solution was dialyzed in water using a 500 Da cutoff membrane and the higher MW fraction was reduced to a semisolid by freeze-drying in vacuo. NMR analysis of the dialyzate gave 71 wt % acrylic acid, 20 wt % HPA, and 9 wt % SMA.

Example 3

Example #2 was repeated with the following exceptions. Propylene glycol (900 g) was charged to the kettle. A monomer solution of 400 g glacial AA was added to the cylinder for addition to the kettle. The initiator solution of 28 g of sodium persulfate and 50 g of deionized water was prepared. The chaser solution of 2 g of sodium persulfate and 8 g of deionized water was prepared.

The final product has a solid content of 41.3%, a final viscosity of 2870 cPs. Residual AA content was 2200 ppm. The weight- and number-average molecular weights were 7676 and 2297 g/mol, respectively.

Example 4

To a two liter round bottom flask, equipped with a mechanical stirrer, heating mantle, thermocouple, condenser, nitrogen inlet and inlets for the addition of cofeeds, was charged 475 g propylene glycol. The kettle contents were stirred and heated to 82±1° C. with a nitrogen sweep. In the meantime, a monomer solution of 280 g of glacial AA and 70 g of butyl acrylate was mixed thoroughly and added to a graduated cylinder for addition to the kettle. An initiator solution of 14 g of LUPERSOL 11 (tert-butyl peroxypivalate), was added to a syringe for addition to the kettle. A chain regulator solution of 21 g of 1-dodecanethiol was added to a syringe for addition to the kettle.

When the kettle contents reached reaction temperature of 82° C., the monomer, initiator and chain regulator cofeeds were started simultaneously and separately. The chain regulator solution was added over 100 minutes, monomer cofeed was added over 120 minutes and the initiator cofeed was added over 125 minutes at 82±1° C. At the completion of the cofeeds, the reaction was held for 15 minutes at 82° C. A chaser of 1.75 g of Lupersol 11 was added to a syringe for addition to the kettle. After 15 minutes, the chaser was added over 10 minutes and then held for 30 minutes. After the hold, the reaction was then cooled and packaged.

The final product has a solid content of 43.9%, residual AA content was 2500 ppm, residual butyl acrylate was 100 ppm. The weight- and number-average molecular weights were 7207 and 1761 g/mol, respectively.

Example 5

To a two liter round bottom flask, equipped with a mechanical stirrer, heating mantle, thermocouple, condenser, Nitrogen inlet and inlets for the addition of cofeeds, was charged 250 g deionized water, 30 g of 50% CAVASOL W7 M TL (Wacker Fine Chemicals). A promoter solution of 9.15 g of 0.15% iron sulfate heptahydrate was prepared and set aside. A kettle additive of 2 g sodium metabisulfite dissolved in 12.75 g of deionized was prepared and set aside. The kettle contents were stirred and heated to 78±1° C. with a nitrogen sweep. At the same time, a monomer solution of 415 g of glacial AA, 50 g of hydroxypropyl acrylate, and 35 g of lauryl methacrylate was mixed thoroughly and added to a graduated cylinder for addition to the kettle. An initiator solution of 1.57 g of sodium persulfate dissolved in 25.5 g deionized water was added to a syringe for addition to the kettle. A chain regulator solution of 38 g of sodium metabisulfite dissolved in 82.5 g of deionized waster was added to a syringe for addition to the kettle.

When the kettle contents reached reaction temperature of 78° C., the promoter solution and bisulfite kettle charge was added to the kettle. Upon return to reaction temperature, the monomer, initiator and chain regulator cofeeds were started simultaneously and separately. The chain regulator solution was added over 100 minutes, monomer cofeed was added over 120 minutes and the initiator cofeed was added over 125 minutes at 78±1° C. At the completion of the cofeeds, rinse water of 25 g was added, the reaction was held for 15 minutes at 78° C. A chaser solution of 0.75 g of sodium persulfate dissolved in 17.5 g of deionized water was prepared and added to the syringe. When hold was completed, the chaser solution was added to the kettle over 10 minutes, then held for 15 minutes.

The reaction was then cooled by adding 150 g of deionized water. During the cool down 105.4 g of 50% sodium hydroxide was added to the kettle via addition funnel, maintaining a temperature below 60° C. Deionized water (50 g) was added to the funnel as a final rinse. Hydrogen peroxide (3.7 g of 30% solution) was added to the kettle as a scavenger. The contents were then cooled and packaged.

The final product has a solid content of 45.1%, pH of 4.61, viscosity of 440 cPs. Residual AA content was <10 ppm. The weight- and number-average molecular weights were 7893 and 2649 g/mol, respectively.

Example 6

The process of Example 2 was repeated with the modification that the reaction temperature was kept at 88±1° C. The final product has a solid content of 38.1%, a final viscosity of 7550 cPs. Residual AA content was 2077 ppm. The weight- and number-average molecular weights were 9404 and 1959 g/mol, respectively. A portion of the polymer solution was dialyzed in water using a 500 Da cutoff membrane and the higher MW fraction was reduced to a semisolid by freeze-drying in vacuo. NMR analysis of the dialyzate gave 68 wt % acrylic acid, 21 wt % HPA, and 9 wt % SMA.

Example 6

Anti-Graying Performance

Two surfactant pre-mixes were prepared using the unit ratios described below.

TABLE 1

Surfactant pre-mix S1.

| Ingredients (in order of addition) | % Active | Amount Added (g) | % in Finished Product |
|---|---|---|---|
| Deionized Water | 100.00 | 694.44 | 69.44 |
| NACCONAL* 90[1] | 90.00 | 155.56 | 12.0 |
| STEOL* CS-460[2] | 60.00 | 0.00 | 2.0 |
| Propylene Glycol | 100.00 | 35.00 | 3.50 |
| Ethanol | 100.00 | 15.00 | 1.50 |
| Polymer Hole | 100.00 | 100.00 | 10.00 |
| Total | | 1000.00 | 100.00 |

[1] Linear alkylbenzenesulfonate, Stepan Co.
[2] Linear fatty alcohol ether sulfate, Stepan Co.
[3] Linear alcohol (C12-15) ethoxylate, POE-7, Stepan Co.

A detergent base formulation was prepared as detailed above and diluted to 0.5 g/L of the formulation shown above.

The Tergotometer experiments were done at ambient temperature (22° C.). The water hardness was set to 300 ppm. (Local tap water has ~80 ppm so the experimenters added 2.2 g of a 2:1 Ca/Mg 100,000 ppm stock solution to 1 L water). The wash time on the Tergotometer was 12 min, followed by a 3 min rinse. There were 5 repeat cycles. We added 2.5 g Big Oak Clay slurry (25%) and 2.5 g of dust sebum (purchased from Scientific Services and comprising a dispersion of Spangler sebum and carbon black/vaccum cleaner dust) as the combination oily/particulate soils. The Tergotometer agitation speed was set at 90 rpm. There were 8 clean stripped cloths added to the wash (2 cotton cloths, 2 cotton interlock cloths, 2 polyester/cotton (65:35, polyester: cotton) cloths and 2 polyester cloths). The cloths were washed, and then tumble-dried. After drying the cloths were read for whiteness index on a Hunter colorimeter along with untreated swatches (pristine).

The experiments assessed the effect of 1 wt % active polymer (based on detergent weight) on the whiteness of cloths of different types in the presence of particulate soil.

TABLE 3

Results from anti-graying test 1.

| | Pristine | Control | A | B | C |
|---|---|---|---|---|---|
| Additive | n/a | none | pAA[1] | Ex. 1a | Ex. 2 |
| Additive, % in detergent | n/a | 0 | 1 | 1 | 1 |
| WI (cotton) | 118.3 | 83.7 | 86.7 | 109.7 | 103.5 |
| WI (polyester) | 72.9 | −0.75 | 4.7 | 53.6 | 40.1 |
| WI (cotton interlock) | 119.6 | 35.8 | 47.9 | 106.1 | 91.3 |
| WI (polyester-cotton blend) | 119.4 | 34.5 | 35.3 | 62.3 | 59.8 |

[1] ACUSOL* 445N, product of The Dow Chemical Company.

Example 7

The Test Conditions Used in Ex. 6 were Repeated Using Fresh Cloths

TABLE 4

Results from anti-graying test 2.

| | Pristine | Control | D | E | F | G |
|---|---|---|---|---|---|---|
| Additive | n/a | none | PG | pAA[1] | Ex. 1a | Ex. 2 |
| Additive, % in detergent | n/a | 0 | 2 | 1 | 1 | 1 |
| WI (cotton) | 115.86 | 83.73 | 83.73 | 87.78 | 93.04 | 79.09 |
| WI (polyester) | 72.75 | −0.75 | 1.06 | 12.43 | 32.02 | 8.51 |
| WI (cotton interlock) | 117.37 | 35.77 | 27.49 | 56.84 | 67.25 | 46.6 |
| WI (polyester-cotton blend) | 119.16 | 34.46 | 31.01 | 46.76 | 49.88 | 32.99 |

[1] ACUSOL* 445N, product of The Dow Chemical Company.

The data show that the inventive polymers work at least as well as a polyacrylic acid homopolymer (pAA) in anti-graying performance.

Example 8

Phase Stability of High-Surfactant Detergent/Polymer Mixtures

A surfactant base containing 36% actives was prepared according to the recipe in Table 5.

TABLE 5

Composition of high-surfactant detergent base.

| Ingredients (in order of addition) | % Active | Amount Added (g) | % in Finished Product |
|---|---|---|---|
| Deionized Water | | 358.89 | 41.00 |
| Witco* 90 Flake[1] | 90.00 | 211.11 | 19.00 |
| BIOSOFT* N25-7[3] | 100.00 | 110.00 | 11.00 |
| Sodium Citrate | 100.00 | 20.00 | 2.00 |
| Propylene Glycol | 100.00 | 50.00 | 5.00 |
| PRIFAC* 7908[4] | 100.00 | 85.00 | 8.50 |
| Ethanol | 100.00 | 15.00 | 1.50 |
| SXS | 40.00 | 50.00 | 2.00 |
| Polymer Hole | 100.00 | 100.00 | 10.00 |
| Total | | 1000.00 | 100.00 |

[1] Sodium dodecylbenzenesulfonate, AkzoNobel.
[2] Linear fatty alcohol ether sulfate, Stepan Co.
[3] Linear alcohol (C12-15) ethoxylate, POE-7, Stepan Co.
[4] Palm oil fatty acids, Croda.

To samples of this detergent base were added 1 wt % pAA (ACUSOL* 445N, product of The Dow Chemical Company) or 1 wt % of the polymer of Example 2. The remainder of the hole was filled with deionized water. The sample containing pAA was hazy and separated immediately into two phases. The sample containing the inventive copolymer was clear and single-phase for at least 12 weeks at ambient temperature, 5° C. and 40° C.

This result shows that polymer made according to this invention has greater compatibility in high-surfactant detergent formulations than does acrylic acid homopolymer.

The invention claimed is:
1. A polymeric dispersant comprising:
(a) from 50 to 95 wt % polymerized residues of monomer (A):

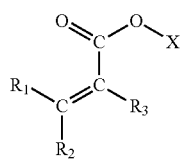

(A)

wherein $R_1$ is hydrogen, methyl, ethyl or COOX; $R_2$ is hydrogen, methyl or ethyl;
$R_3$ is hydrogen, methyl or ethyl; and X is hydrogen, sodium, potassium, ammonium or a combination thereof;
(b) from 1 to 20 wt % polymerized residues of monomer (B):

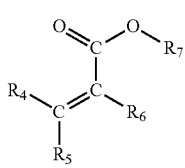

(B)

wherein $R_4$, $R_5$, and $R_6$ independently are hydrogen, methyl or ethyl; $R_7$ is $C_8$-$C_{30}$ alkyl or $C_8$-$C_{30}$ aralkyl; and
(c) from 3 to 30 wt % polymerized residues of monomer (C):

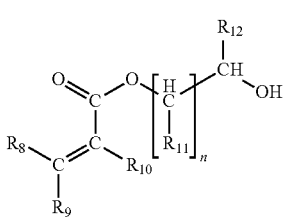

(C)

wherein $R_8$, $R_9$, and $R_{10}$ independently are hydrogen, methyl or ethyl; $R_{11}$ and $R_{12}$ independently are hydrogen, $C_1$-$C_8$ alkyl or hydroxymethyl; and n is an integer from 1 to 3.

2. The polymeric dispersant of claim 1 in which $R_1$ is hydrogen, methyl or COOX; $R_2$ and $R_3$ independently are hydrogen or methyl; $R_4$, $R_5$, and $R_6$ independently are hydrogen or methyl; $R_7$ is $C_{12}$-$C_{30}$ alkyl or $C_{12}$-$C_{30}$ aralkyl; $R_8$ and $R_9$ are hydrogen; $R_{10}$ is hydrogen or methyl; $R_{11}$ and $R_{12}$ independently are hydrogen, $C_1$-$C_4$ alkyl or hydroxymethyl; and n is 1 or 2.

3. The polymeric dispersant of claim 2 having from 55 to 90 wt % polymerized residues of monomer (A), 4 to 18 wt % polymerized residues of monomer (B) and 5 to 30 wt % polymerized residues of monomer (C).

4. The polymeric dispersant of claim 3 having $M_n$ from 1,200 to 4,000.

5. The polymeric dispersant of claim 4 in which $R_1$ and $R_2$ are hydrogen; $R_3$ is hydrogen or methyl; $R_4$ and $R_5$ are hydrogen; $R_6$ is hydrogen or methyl; $R_7$ is $C_{16}$-$C_{22}$ alkyl; $R_8$ and $R_9$ are hydrogen; $R_{10}$ is hydrogen or methyl; $R_{11}$ and $R_{12}$ independently are hydrogen, methyl or hydroxymethyl.

6. The polymeric dispersant of claim 5 in which the polymeric dispersant has from 60 to 85 wt % polymerized residues of monomer (A), 6 to 15 wt % polymerized residues of monomer (B) and 6 to 25 wt % polymerized residues of monomer (C).

7. A method for making a polymeric dispersant comprising:
(a) from 50 to 95 wt % polymerized residues of monomer (A):

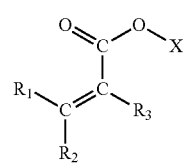

(A)

wherein $R_1$ is hydrogen, methyl, ethyl or COOX; $R_2$ is hydrogen, methyl or ethyl;
$R_3$ is hydrogen, methyl or ethyl; and X is hydrogen, sodium, potassium, ammonium or a combination thereof;
(b) from 1 to 20 wt % polymerized residues of monomer (B):

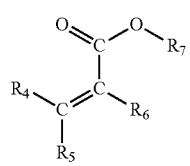

(B)

wherein $R_4$, $R_5$, and $R_6$ independently are hydrogen, methyl or ethyl; $R_7$ is $C_8$-$C_{30}$ alkyl or $C_8$-$C_{30}$ aralkyl; and
(c) from 3 to 30 wt % polymerized residues of monomer (C):

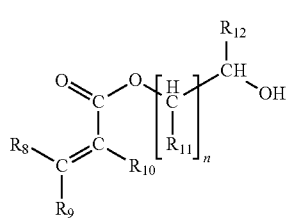

(C)

wherein $R_8$, $R_9$, and $R_{10}$ independently are hydrogen, methyl or ethyl; $R_{11}$ and $R_{12}$ independently are hydrogen, $C_1$-$C_8$ alkyl or hydroxymethyl; and n is an integer from 1 to 3;
said method comprising combining a monomer of structure (A) and a monomer of structure (B) in a solvent mixture comprising an organic polyol and water, wherein the organic polyol has formula (I):

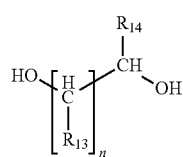
(I)

wherein $R_{13}$ and $R_{14}$ independently are hydrogen, $C_1$-$C_8$ alkyl or hydroxymethyl; and n is an integer from 1 to 3.

8. The method of claim 7 in which $R_1$ is hydrogen, methyl or COOX; $R_2$ and $R_3$ independently are hydrogen or methyl; $R_4$, $R_5$, and $R_6$ independently are hydrogen or methyl; $R_7$ is $C_{12}$-$C_{30}$ alkyl or $C_{12}$-$C_{30}$ aralkyl; $R_8$ and $R_9$ independently are hydrogen or methyl; $R_{10}$ is hydrogen or methyl; $R_{11}$ and $R_{12}$ independently are hydrogen, $C_1$-$C_4$ alkyl or hydroxymethyl; $R_{13}$ and $R_{14}$ independently are hydrogen, $C_1$-$C_4$ alkyl or hydroxymethyl; and n is 1 or 2; wherein the polymeric dispersant has from 55 to 90 wt % polymerized residues of monomer (A), 4 to 18 wt % polymerized residues of monomer (B) and 5 to 30 wt % polymerized residues of monomer (C).

9. The method of claim 8 in which monomers and a free-radical initiator are fed into the solvent mixture in a stirred reactor over a period of 1-6 hours, temperature of the reactor contents is maintained from 50-130° C. and a ratio of water:organic polyol is from 1:6 to 1:100.

10. The method of claim 9 in which $R_1$ and $R_2$ are hydrogen; $R_3$ is hydrogen or methyl; $R_4$ and $R_5$ are hydrogen; $R_6$ is hydrogen or methyl; $R_7$ is $C_{16}$-$C_{22}$ alkyl; $R_8$ and $R_9$ are hydrogen; $R_{10}$ is hydrogen or methyl; $R_{11}$ and $R_{12}$ independently are hydrogen, methyl or hydroxymethyl; and $R_{13}$ and $R_{14}$ independently are hydrogen, methyl or hydroxymethyl; wherein the polymeric dispersant has from 60 to 85 wt % polymerized residues of monomer (A), 6 to 15 wt % polymerized residues of monomer (B) and 6 to 25 wt % polymerized residues of monomer (C).

11. A detergent composition comprising:
(a) from 10 to 55 wt % surfactant;
(b) from 40 to 80 wt % water; and
(c) from 0.4 to 10 wt % of a polymeric dispersant comprising:

(i) from 50 to 95 wt % polymerized residues of monomer (A):

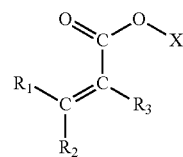
(A)

wherein $R_1$ is hydrogen, methyl, ethyl or COOX; $R_2$ is hydrogen, methyl or ethyl;
$R_3$ is hydrogen, methyl or ethyl; and X is hydrogen, sodium, potassium, ammonium or a combination thereof;

(ii) from 1 to 20 wt % polymerized residues of monomer (B):

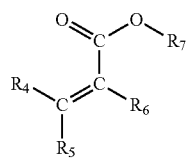
(B)

wherein $R_4$, $R_5$, and $R_6$ independently are hydrogen, methyl or ethyl; $R_7$ is $C_8$-$C_{30}$ alkyl or $C_8$-$C_{30}$ aralkyl; and (iii) from 3 to 30 wt % polymerized residues of monomer (C):

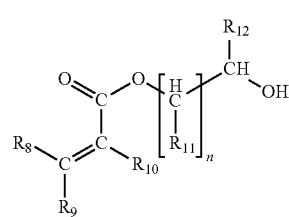
(C)

wherein $R_8$, $R_9$, and $R_{10}$ independently are hydrogen, methyl or ethyl; $R_{11}$ and $R_{12}$ independently are hydrogen, $C_1$-$C_8$ alkyl or hydroxymethyl; and n is an integer from 1 to 3.

\* \* \* \* \*